United States Patent
Cohen et al.

[15] 3,705,535
[45] Dec. 12, 1972

[54] FLUIDIC ON-LINE SYSTEM TESTER

[72] Inventors: Kenneth W. Cohen; Thomas E. Martin, both of Chesterland, Ohio

[73] Assignee: Bailey Meter Company

[22] Filed: Oct. 26, 1970

[21] Appl. No.: 83,776

[52] U.S. Cl. ..................73/420, 73/389, 73/406, 200/81.4
[51] Int. Cl. ..............................................G01l 7/08
[58] Field of Search .....73/420, 389, 406; 251/149.6, 251/339; 137/614.03; 200/81.4, 81.5

[56] References Cited

UNITED STATES PATENTS

| | | | |
|---|---|---|---|
| 2,618,978 | 11/1952 | Ragland | 73/420 |
| 2,274,329 | 2/1942 | Hammond | 200/81.4 |
| 3,260,119 | 7/1966 | Jones | 73/420 |
| 3,230,966 | 1/1966 | Debrotnic et al. | 251/149.5 |

*Primary Examiner*—Donald O. Woodiel
*Attorney*—Joseph M. Maguire

[57] ABSTRACT

A pressure testing device for on-line testing of a fluidic element in a system where a self-sealing test valve is mounted in the system, and the pressure therein is sensed by a test probe which makes a secondary seal with the valve before breaking the valve's self-seal. This secondary seal is maintained until partial extraction of the probe allows the jack to reseal itself. The secondary seal is broken only upon complete extraction of the probe. The probe capacitance is negligible with respect to the system capacitance in order to prevent sudden pressure drops from occurring. A sensor, amplifier, readout and power supply is built into the probe which is hand held and self-contained.

8 Claims, 8 Drawing Figures

PATENTED DEC 12 1972

INVENTORS
KENNETH W. COHEN
BY THOMAS E. MARTIN

Joseph L. Brzuszek
ATTORNEY

INVENTORS
KENNETH W. COHEN
BY THOMAS E. MARTIN
Joseph L. Bryuszek
ATTORNEY

INVENTORS
KENNETH W. COHEN
BY THOMAS E. MARTIN

Joseph L. Brzuszek
ATTORNEY

FLUIDIC ON-LINE SYSTEM TESTER

BACKGROUND OF THE INVENTION

1. Field of the Invention

This invention relates to pressure testing equipment generally and, more particularly, to a device for testing operating pressures of fluidic elements on-line, i.e. under actual operating conditions without introducing disturbing signal changes from the test apparatus or the external ambient.

The invention is particularly applicable to test measuring the fluid pressure at the input and output of fluidic logic elements, e.g. AND, OR, NOR gates and other active elements, and will be described with particular reference thereto although it will be appreciated that the invention has broader applications such as for test measuring fluid pressure, on-line, at any point in a fluidic or pneumatic system.

2. Description of the Prior Art

Pressure testing apparatus, for pneumatic and fluidic systems, has heretofore included either pressure transducers, more or less permanently interposed in the system at various locations where the pressure is to be determined or the removal of system connections with the insertion of a pressure transducer therein. Generally, the pressure transducer has screw or plug fittings which are connected into the system, and a pressure gauge is connected thereto to provide an indication proportional to the pressure therein.

The requirements for pressure testing apparatus used in fluidic logic systems are generally more stringent than those used for pneumatic systems. The pneumatic systems presently in use are principally of the analog type, and the test measuring apparatus used therefor is characterized by the following: pressure drops caused by low impedance probe couplings resulting in pneumatic transients, large volumes of air used and slow speed of response. These characteristics of pressure testing apparatus for pneumatic systems have been tolerated at the expense of accuracy, repeatability and uniformity of measurements. Notwithstanding that these characteristics have been tolerated in pneumatic systems, they are not tolerable in fluidic systems because they can materially affect the operation of the system.

One of the principal problems with pressure testing apparatus of the above type, when used in a fluidic system, is that a pressure drop caused by a low impedance probe can switch an active fluidic element, resulting in a material change in the system.

Another problem with pressure testing apparatus of this type is that a fluidic system generally operates with a small volume of air as compared with a pneumatic system, and the relatively large volume of air required by a low impedance probe severely deteriorates system performance. Also, the pressure transients resulting from insertion and removal of the apparatus in the fluidic system presents formidable problems.

The speed of response of pressure testing apparatus should be compatible with the speed of response of the system in which it is used. Apparatus presently being used to test measure fluidic systems does not satisfy this standard.

The present invention contemplates new and improved apparatus which overcomes all of the above referred problems and others and provides a pressure testing apparatus which is simple, efficient and accurate.

SUMMARY OF THE INVENTION

In accordance with the present invention there is provided an apparatus for pressure testing a fluidic element in a system without introducing disturbing signal changes within the system.

Apparatus of the general type described is provided, comprising: a self-sealing fitting mounted at a test location in the system; means for removably coupling in sealed relationship with the fitting including a capillary tube having a first end penetrating the seal of the fitting; and, means coupled to the other end of the tube for converting the system pressure therein to a realizable indication of its relative magnitude.

Further in accordance with the invention, apparatus of the general type described is provided, wherein the converting means includes a pressure sensitive switch mounted within the coupling means, and the switch has both a pressure sensitive surface responsive to the system pressure and an electrical output contact having its state of conduction controlled by a predetermined threshold value of the system pressure acting on the pressure sensitive surface.

Further in accordance with the invention, apparatus of the general type described is provided, wherein the coupling means includes means for sealing the probe with the fitting while the first end of the tube penetrates the self-seal of the fitting so that leakage of fluid from the system is minimized.

The principal object of the invention is to provide a test apparatus for discernibly indicating the fluid pressure in a fluidic system without introducing a significant pressure drop otherwise resulting in pressure transients.

Another important object of the invention is to provide an on-line tester of the above type which includes a capillary tube coacting with a pressure sensitive transistor to provide an electrical output signal proportional to pressure introduced in the capillary tube.

Other important objects of the invention include providing a tester of the above type which has a speed of response compatible with fluidic components, and is simple, efficient and accurate.

BRIEF DESCRIPTION OF THE DRAWINGS

FIG. 1 is a partial cross-sectional view of a fluidic test probe with a test valve shown in FIG. 1a.

DESCRIPTION OF THE PREFERRED EMBODIMENTS

Figure 1:
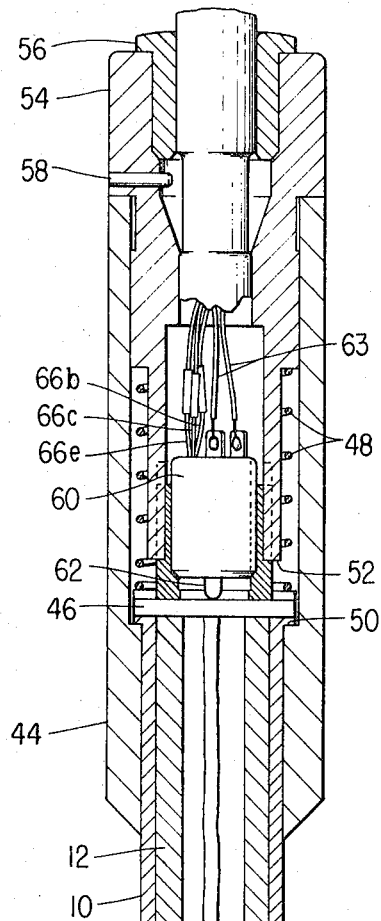

Referring now to the drawings wherein the showings are for purposes of illustrating the preferred embodiments of the invention only and not for the purpose of limiting same, FIG. 1 shows the coupling end of a test probe. The probe includes a probe housing 10 having a protective shroud 22 at one end and a trip plate 46 at the opposite end fitting into one end of a handle 44. The other end of the handle 44 is joined to an end cap 54, which extends into the handle 44 and which is plugged by an end plug 56 joined to the end cap 54 by a dowel pin 58.

An inner housing 12 is located internally of the probe housing 10. One end of the inner housing 12 is proximate to the protective shroud 22 and is terminated by a mounting element 14 holding a pressure sensitive transistor 16 which is sealed against ambient pressure except through a connecting passage 20. The mounting element 14 has a capillary tube 18 extending into it and communicating with the connecting passage 20. The end of the capillary tube 18 has a notch 42 at its open end, and an O-ring seal 40 is affixed to a position near the end of the capillary tube 18. The capillary tube 18 extends into the protective shroud 22 with the ends of both normally terminating in substantially the same plane.

Near the other end of the inner housing 12 is an electrical switch 60 mounted within the handle 44. A trip actuator 62, of the switch 60, rests against the trip plate 46 in the normal extended position. The inner housing 12 is hollow and has a terminal 65, located internally, with lead wires 64b, c, e extending from the pressure sensitive transistor 16 and terminating thereon. The wires 65b, c, e are connected through the terminal 65 to strain relieved lead wires 66b, c, e respectively, these wires running the remaining length of the test probe. The electrical switch 60 has switch wires 63 also running through the test probe.

Figure 1A:
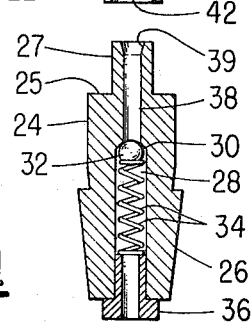

In the coupling operation of the probe and the valve of FIG. 1a, the probe housing 10 slides inside the handle 44 with its travel limited by a front shoulder stop 50 and a back shoulder stop 52. Normally the probe housing 10 is held in its position against the front shoulder stop 50 by a spring 48. Applying a force on the probe housing 10, which acts against the force of the spring 48, causes the trip plate 46 to come to rest against the back shoulder stop 52. In this position, the trip actuator 62 is tripped by the trip plate 46 indicating that a coupling between the test probe and valve, has been accomplished. Removing the above force restores the probe housing 10 to its normal position with the trip plate 46 acting against the front shoulder stop 50 and the trip actuator 62 returned to its non-tripped position.

Referring now to FIG. 1a, a valve used for coupling with the test probe is shown. It has an insert end 26, which may be screw threaded to facilitate mounting to the system tested. A valve body 24 extends from the insert end terminating in a step 25 from which a coupling end 27 extends. The coupling end 27 has a tapered lead-in 39 entering into a capillary tube channel 38 running the length of the coupling end 27 and partly into the valve body 24. The capillary tube channel runs into a pressure chamber 28 having a seat 30 at the entrance of the capillary tube channel. A ball 32 is pressed against the seat 30 by a ball spring 34 held by a retainer 36. The ball 32 thus seals the pressure chamber 28 from the capillary tube channel.

Figure 2:
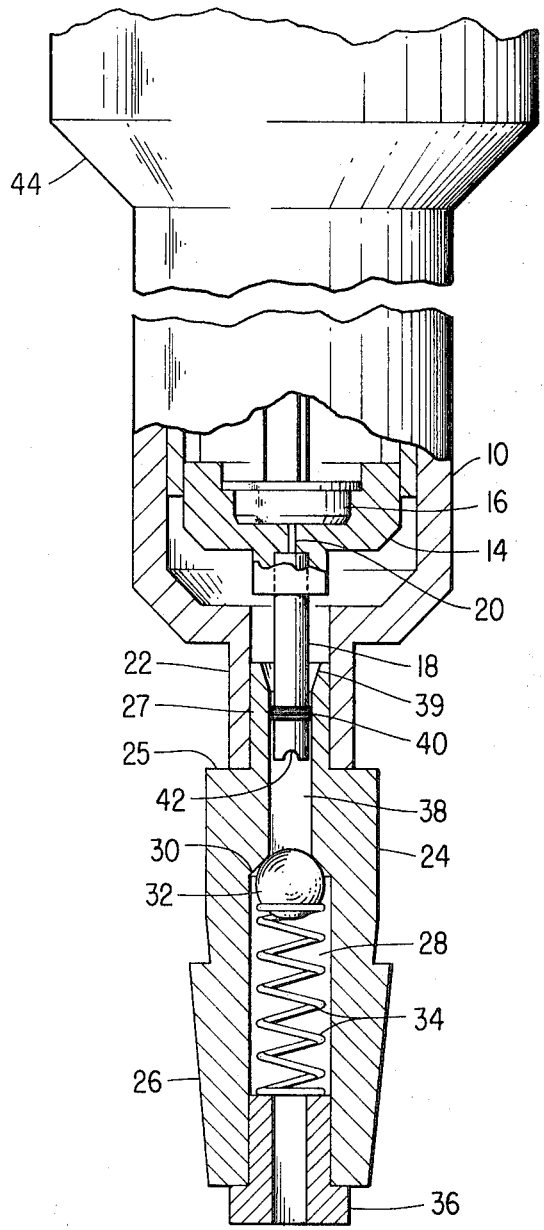
FIG. 2 is a partial cross-sectional view showing the sealed relationship of the end of the probe mated with the valve.

Referring now to FIG. 2, initial coupling between test probe and valve has been affected by sliding the protective shroud 22 over the coupling end 27 until it is resting on the step 25. The capillary tube 18 is simultaneously inserted into the capillary tube channel 38 with the O-ring 40 sealing the channel 38. Thus there are two seals in effect, the O-ring 40 and the ball 32. As the test probe is pushed further against the valve, the probe housing 10 slides into the handle 44 allowing the capillary tube to travel further into the capillary tube channel 38 until it breaks the seal of the ball 32 by pushing the ball 32 away from the seat 30. The seal of the O-ring 40 is intact, and the pressure in pressure chamber 28 is transmitted through the notch 42 into the capillary tube 18 and thereby to the pressure sensitive transistor 16. As the test probe is withdrawn, the end of the capillary tube 18 disengages from contact with the ball 32 allowing the spring 34 to push it against the seat 30, sealing the pressure chamber 28 while the seal from the O-ring 40 remains intact. This O-ring seal is effective until the test probe is almost completely disengaged from the valve.

Figures 3, 4:
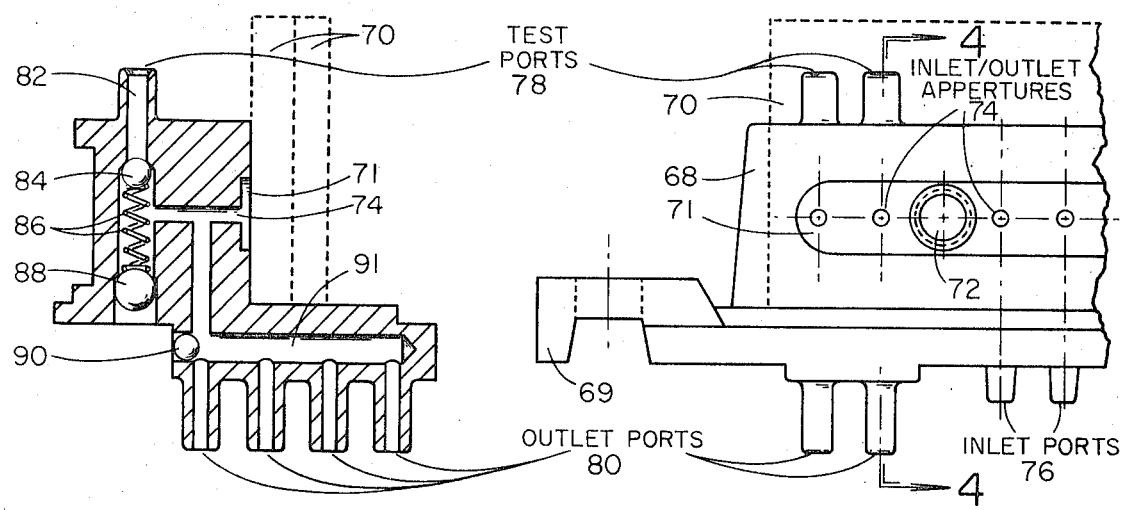
FIG. 3 is a side elevational view of a fluidic manifold with integral test valves.
FIG. 4 is a cross-sectional view taken along 4—4 in FIG. 3 rotated 90 degrees out of the plane of the paper.

Referring now to FIG. 3, a fluidic device 70 (one of design choice) is connected to the manifold body 68 by one or more couplers 72. A connecting groove 71 in the body 68 has inlet/outlet apertures 74 communicating with the fluidic device 70. The manifold body 68 provides, respectively, a plurality of test ports 78, inlet ports 76, and outlet ports 80. A mounting flange 69 extends from the end of the manifold body 68 for mounting to a base. In operation the manifold provides a means of coupling the test ports 78 to the outlet ports 80, as well as providing supply pressure to the fluidic device 70.

Referring now to FIG. 4, a capillary tube channel 82 is sealed by a ball seal 84 which is retained by a ball spring 86 resting on a spring retaining ball 88. A ball seal 90 seals one end of a passageway 91 connecting the outlet ports 80. In operation, the test probe couples with each of the test ports 78 in the manner described in reference to FIG. 1a.

Figure 5:
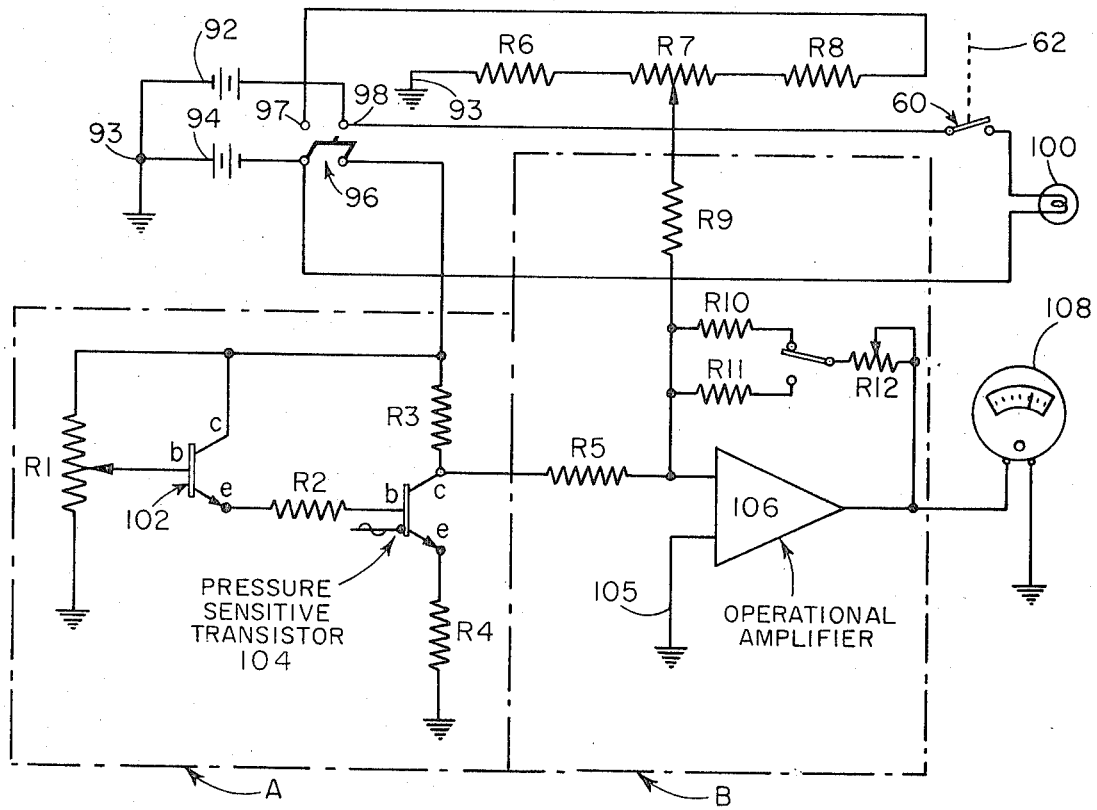
FIG. 5 is a schematic diagram of one embodiment of an amplifier circuit for the probe connected to a pressure sensitive transistor responsive to fluid pressure.

Referring now to FIG. 5, in block form, Block A is a compensation and detection circuit which provides an analog signal proportional to the applied pressure. The signal from Block A is fed into Block B, which is the operational amplifier circuit with zero and range adjustment which amplifies and adjusts the signal up to a level suitable for displaying on a voltage indicating meter 108. Power to the circuit is provided by a voltage source 92, which is positive with respect to a reference 93, and a voltage source 94, which is negative with respect to the reference 93. A double pole switch 96 connects the power sources to the circuit. One side of the switch 96 connects a contact 97 to the voltage source 94 while the other side of the switch connects a contact 98 to the voltage source 92 when the switch 96 is in the conducting or "on" position. A bulb indicator 100 is connected across the power sources 92, 94. This allows the bulb indicator to light whenever the trip actuator 62 closes the switch 60, indicating proper coupling between test probe and valve as described above with reference to FIG. 1.

Block A is comprised of a pressure sensitive solid state effect device or transistor 104 and a temperature compensating transistor 102, the above transistors coupled in common-emitter configuration. A resistor R2 affects the sensitivity of the pressure sensitive transistor 104, and its value is determined from a temperature coefficient curve supplied with pressure sensitive transistors manufactured by Stow Laboratories, Inc. A potentiometer R1 directly affects the temperature coefficient and is adjusted to make the coefficient more negative or to swing the coefficient in a positive direction. The pressure sensitive transistor 104 is mechanically coupled to the applied pressure signal as depicted by the directional input to the base terminal of transistor 104.

Block B is comprised of an operational amplifier 106 used as part of a summing circuit, with a pair of resistors R9 and R5 forming summing branches; (R10 + R12) or (R11 + R12) forming the feedback branch; the common lead is connected to a reference 105 which is at the same potential as reference 93.

In operation, pressure is applied to the pressure sensitive transistor 104 which provides a proportional voltage signal output across resistor R5. The general equation for the operational amplifier 106 output is the following:

$$E_o = E_{in} R_f / R_{in}$$

Where:
$E_o$ = output voltage from the amplifier.
$E_{in}$ = input voltage to the amplifier.
$R_f$ = feedback resistance of the amplifier.
$R_{in}$ = input resistance of the amplifier.

Applying this general equation to the circuit in FIG. 5, gives us $$E_o = R_f(V_{R9}/R9) + (V_{R5}/R5)$$

Where:
$V_{R5}$ = pressure sensitive transistor output voltage.
$V_{R9}$ = voltage across R9.

A meter 108 is connected to the output of the operational amplifier 106, and can be zeroed for zero pressure input by varying the voltage $V_{R9}$ through a potentiometer R7 until it is made equal to $V_{R5}R9/R5$, at which time $E_o$ will be zero since $V_{R9}$ is negative with respect to $V_{R5}$. A pair of voltage dropping resistors R6, R8 are series connected with R7 across voltage source 94. Range adjustment of meter 108 is accomplished by the amount of feedback resistance $R_f$. In the circuit $R_f$ can be switched to either $(R_{10} + R_{12})$ or $(R_{11} + R_{12})$ depending on the amount of gain and calibration required. A potentiometer $R_{12}$ serves as a fine range adjustment. The meter 108 can receive the output signal from the operational amplifier 106 through a switch arrangement (not shown).

Figure 6:
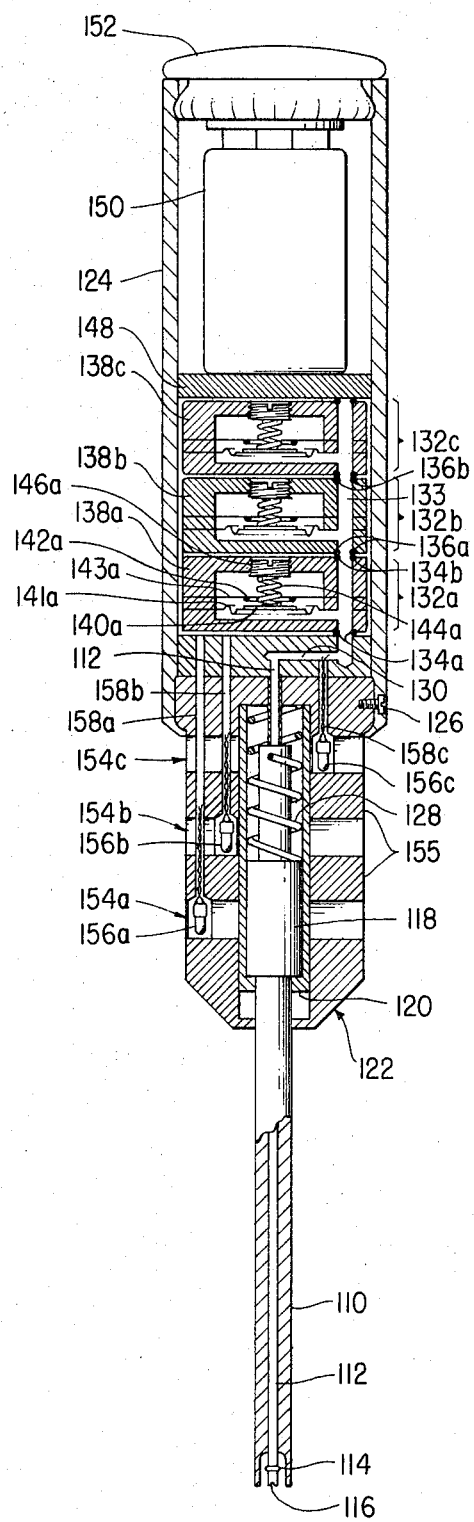
FIG. 6 is a partial cross-sectional view of another embodiment of a fluidic test probe having a plurality of electro-fluidic switching devices.

Referring now to FIG. 6, an alternative embodiment of the test probe is shown. A handle 124 has one end covered by an end cap 152. The opposite end of the handle is fastened to a retaining assembly 122 by a machine screw 126 extending through the handle 124 and into a portion of the retaining assembly 122 internal to the handle 124. The retaining assembly includes a ring lens assembly 154a, b, c, separated by ring spacers 155, and each having an indicating bulb 156a, b, c, respectively.

A retractable probe housing 110 extends from a slide sleeve 120 which is internal to the retaining assembly 122. An enlarged slide 118 along the housing 110 is acted upon within the slide sleeve 120 by a return spring 128. A capillary tube 112 is located internally of the probe housing 110 and terminates at a connecting chamber 130. The end of the capillary tube has a notch 116 as well as an O-ring seal 114 disposed upwardly from the notch.

Internal to the handle 124 is located a low pressure switch 132a, a normal pressure switch 132b, and a high pressure switch 132c, all communicating through a common pressure line 133 formed by stacking the above switches with inlet of one switch against the outlet of the next switch. The stack of switches is insulated from a dry-cell battery 150 by an insulator interface 148 which also serves to seal the outlet of switch 132c. An inlet seal 134a of the pressure switch 132a is interfaced with the connecting chamber 130. The outlet of the pressure switch 132a has an outlet seal 134b against the inlet of the pressure switch 132b which has an inlet seal 136a and an outlet seal 136b.

Figure 7:
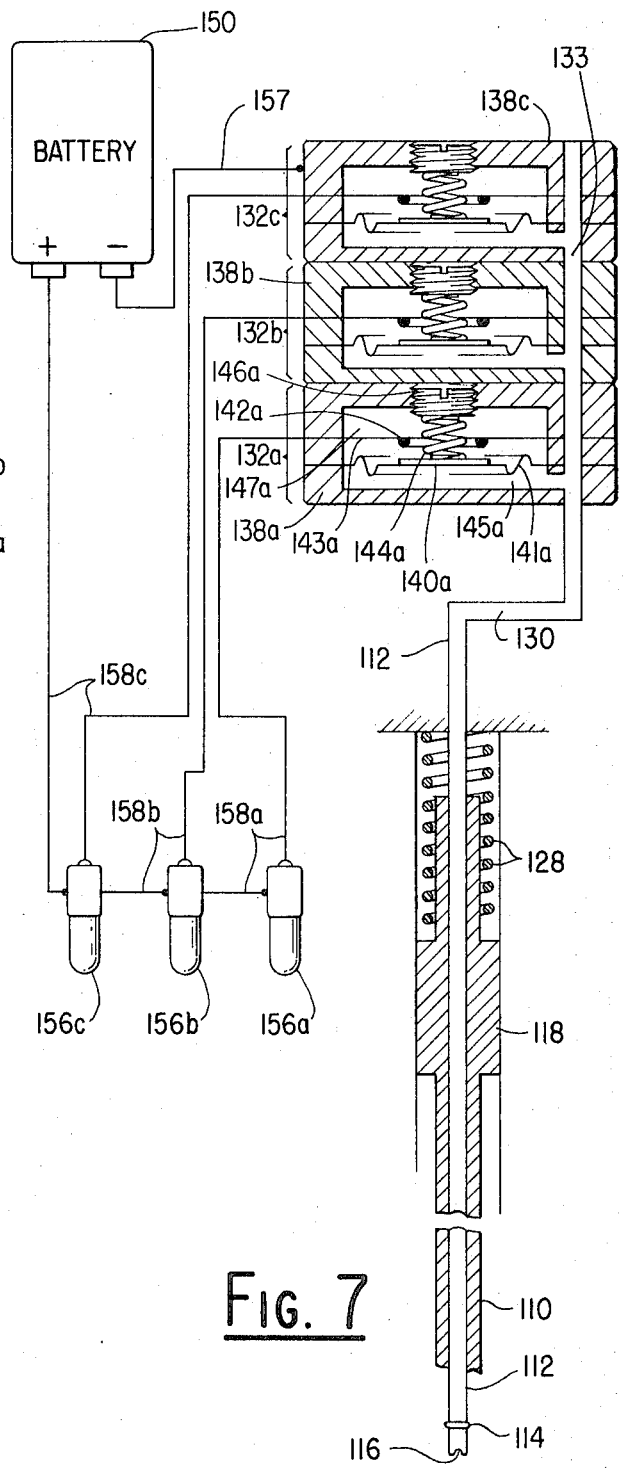
FIG. 7 is a schematic diagram of the switching devices of FIG. 6, supplied from a common fluid input.

Inside each of the switch bodies 138a, b, c, and typified by switch 132a, there is a cavity separated into a sensing chamber 145a and a switching chamber 147a by a diaphragm 141a as can be seen with reference to FIG. 7. The sensing chamber 145a has an inlet to the common pressure line 133. The side of the diaphragm 141a, facing the switching chamber 147a, has a diaphragm plate 140a contacting an adjustment spring 144a which is retained by an adjustment screw 146a. Spaced from the diaphragm 141a there is an apertured insulating board 143a, with a ring contact 142a facing the diaphragm plate 140a. The adjustment spring 144a passes through the hole in the insulating board 143a.

In operation, when the probe couples with the valve, the retractable probe housing 110 slides in the slide sleeve 120. This action permits the capillary tube 112, while sealing the capillary tube channel in the valve with the O-ring seal 114, to penetrate into the pressure chamber. The pressure is transmitted through the notch 116, through the capillary tube 112, into the connecting chamber 130 and thereby to the common pressure line 133 which inlets into the pressure switches 132a, 132b, 132c. The pressure on the diaphragm 141a forces the diaphragm plate 140a toward the ring contact 142a. The pressure required to make contact between the ring contact 142a and the diaphragm plate 140a is adjusted by turning the adjustment screw 146a which forces the adjustment spring 144a against the diaphragm plate 140a. Depending on the level of the applied signal, one or more of the switches may make contact between the ring contact and the diaphragm plate thereby closing its respective circuit and causing the respective indicating bulbs 156a, 156b, 156c, to light.

Referring again to FIG. 7, lead wires 158a are connected between the ring contact 142a of the low pressure switch 132a and one terminal of the indicating bulb 156a and between the common terminals of the indicating bulbs 156a, b. Similarly lead wires 158b are connected between the normal pressure switch 132b leading to one terminal of the indicating bulb 156b and between the common terminals of indicating bulbs 156b, 156c. Likewise lead wires 158c are connected between the high pressure switch 132c to one terminal of the indicating bulb 156c and to one terminal of the battery 150. A common lead wire 157 is connected between the other terminal of the battery 150 and the switch body which is either conductive or which may have a conductive strap contacting the adjacent switch body or strap.

In operation when the ring contact 142a contacts the diaphragm plate 140a, a conductive path is formed through lead wires 158a to energize the indicating bulb 156a; the indicating bulbs 156b, 156c being likewise energized in a parallel connection when the respective threshold pressure for each associated switch has been exceeded. As a result, the indicating bulb 156a lights to illuminate the ring lens assembly 154a indicating if a low pressure level is present. If an intermediate or high pressure is present, a conductive path is formed for the normal pressure switch 132b and the high pressure switch 132c, and the elevated signal is discernibly indicated in the assemblies 154a, 154b, and 154c which will be lit concurrently in accordance with the signal level.

The invention has been described with reference to the preferred embodiments. Obviously, modification and alterations will occur to others upon the reading and understanding of this specification. It is our intention to include all such modifications and alterations insofar as they come within the scope of the appended claims or the equivalence thereof.

What we claim as new and desire to secure by Letters Patent of the United States is:

1. A pressure testing apparatus for a fluidic element in a system comprising:
   a self-sealing valve mounted at a test location in the system;
   a test probe removably coupled in sealed relationship with said valve, said test probe including a capillary tube having a first end penetrating the seal of said valve so that the system pressure is transmitted through said tube;
   said test probe further comprising a handle having retractably means for receiving said capillary tube;
   means within said handle and coupled to the other end of said tube, for converting the system pressure therein to a discernable indication of the relative magnitude thereof;
   wherein said converting means includes a plurality of pressure sensitive switches mounted in stacked relation within said test probe handle and each responsive to the system pressure transmitted through said tube and having its state of conduction controlled by a unique predetermined threshold value of the system pressure acting on said respective pressure sensitive switch said converting means also including indicating means, coupled to said output contacts of said switches, for indicating when the system exceeds the respective threshold values.

2. The pressure testing apparatus as set forth in claim 1, wherein said probe includes means for sealing said probe with said valve while the first end of said tube penetrates the self-seal of said valve so that leakage of fluid from the system is minimized.

3. The pressure testing apparatus as set forth in claim 2, wherein said sealing means of said probe includes an O-ring, said tube having an annular depression a predetermined distance from the first end to retain said O-ring thereon, said O-ring sealing said tube with said valve when coupled together.

4. The pressure testing apparatus as set forth in claim 3, wherein said valve includes a projecting element having a passageway therein for receiving the first end of said tube with said O-ring, said valve also including a check-ball and spring means for biasing said check-ball against the interior of said projecting element to seal the passageway, said check-ball deflecting under the force of the first end of said tube when said test probe is coupled with said valve so that the system pressure is transmitted through said tube to said converting means.

5. The pressure testing apparatus as set forth in claim 4, wherein said tube is formed with the first end having a notch therein, the notch being limited in longitudinal extent to the predetermined distance to the annular depression therein for said O-ring.

6. The pressure testing apparatus as set forth in claim 4, wherein said valve is in a manifold associated with the fluidic system.

7. The pressure testing apparatus as set forth in claim 1 wherein said pressure sensitive switches mounted within said handle in stacked relation are in communication with a common pressure line.

8. A pressure testing apparatus for a fluidic element in a system comprising:
   a self-sealing valve mounted at a test location in the system;
   a test probe removably coupled in sealed relationship with said valve, said test probe including a capillary tube having a first end penetrating the seal of said valve so that the system pressure is transmitted through said tube;
   means, coupled to the other end of said tube, for converting the system pressure therein to a discernible indication of the relative magnitude thereof;
   wherein said probe includes means for sealing said probe with said valve while the first end of said tube penetrates the self-seal of said valve so that leakage of fluid from the system is minimized;
   wherein said sealing means of said probe includes an O-ring, said tube having an annular depression a predetermined distance from the first end to retain said O-ring thereon, said O-ring sealing said tube with said valve when coupled together;
   wherein said valve includes a projecting element having a passageway therein for receiving the first end of said tube with said O-ring, said valve also including a check-ball and spring means for biasing said check-ball against the interior of said projecting element to seal the passageway, said check-ball deflecting under the force of the first end of said tube when said test probe is coupled with said valve so that the system pressure is transmitted through said tube to said converting means;
   wherein said probe further includes a first hollow elongated member having a first open end and a second end, said tube being concentrically fixed within said first hollow member with the first end of said tube emerging therefrom;
   a second hollow elongated member having an interior cross-sectional shape conforming to the exterior cross-sectional shape of the second end of said first hollow member, said first hollow member being slidably positioned in said second hollow member so that the first end of said first hollow member protrudes from said second hollow member;

spring means for biasing said first hollow member relative to said second hollow member; and, stop means for limiting the sliding travel of said hollow members relative to each other when the first end of said tube has deflected the check-ball a predetermined amount when said probe has been coupled with said fitting.

* * * * *